United States Patent
Goulish

[15] 3,659,905
[45] May 2, 1972

[54] MODULATED HYDRAULIC ANTI-LOCK BRAKE BOOSTER

[72] Inventor: Joseph N. Goulish, Fenton, Mich.
[73] Assignee: General Motors Corporation, Detroit, Mich.
[22] Filed: Nov. 23, 1970
[21] Appl. No.: 91,811

[52] U.S. Cl. ........................................................ 303/21 F
[51] Int. Cl. ........................................................ B60t 8/06
[58] Field of Search .......................................... 303/21 F

[56] References Cited

UNITED STATES PATENTS

| | | | |
|---|---|---|---|
| 3,291,538 | 12/1966 | Bulgin | 303/21 F |
| 3,401,982 | 10/1968 | Walker et al. | 303/21 F |

Primary Examiner—Richard E. Aegerter
Assistant Examiner—H. S. Lane
Attorney—W. E. Finken and D. D. McGraw

[57] ABSTRACT

An integrally housed open-center hydraulic brake booster and anti-lock modulator wherein a flow restriction induced back-pressure resulting from movement of a reaction piston into proximity with a manual piston forcibly moves a power piston to actuate the master cylinder. A control valve is shifted upon impending wheel lock to channel the back-pressure to the other side of the power piston to release the brake pressure. The reaction piston, manual piston, and power piston are abuttingly engageable upon over-travel of the operator actuable pedal push rod to actuate the master cylinder independently of hydraulic booster fluid flow.

3 Claims, 3 Drawing Figures

Patented May 2, 1972

INVENTOR.
Joseph N. Goulish
BY
D. D. McGraw
ATTORNEY

MODULATED HYDRAULIC ANTI-LOCK BRAKE BOOSTER

The present invention relates to a wheel anti-lock control system and more particularly to a wheel anti-lock control system featuring a combined open-center hydraulic brake booster and anti-lock modulator.

It is desirable in a motor vehicle wheel anti-lock control system to provide a power assisted master cylinder to operate the vehicle wheel brakes and a brake pressure modulator to prevent wheel lock-up by cyclically releasing and reapplying the brake in accordance with vehicle wheel deceleration. It is also desirable to package the power booster and modulator as a single unit so as to minimize unit size, cost, and complexity.

The present invention provides a power brake booster and anti-lock modulator which are integrally housed. The wheel anti-lock control system includes a fluid pump and fluid reservoir which provide a flow of operating fluid through the combined open-center hydraulic booster and anti-lock modulator. The booster and modulator assembly actuates a master cylinder which generates braking pressure for a set of controlled vehicle wheel brakes. An operator actuable reaction piston within the booster and modulator assembly is moved into proximity with a manual piston creating a fluid restriction which causes a back-pressure. The back-pressure forcibly moves a power piston which is operatively connected to the master cylinder to actuate the brakes. The back-pressure is also channeled to act on the reaction piston to provide pedal feel. An electronic anti-lock sensor and signal generator shifts a control valve when an incipient wheel lock condition if sensed to block the flow of operating fluid to the fluid flow restriction allowing dissipation of the booster operating back-pressure from the power piston and to channel the operating fluid directly to the other side of the power piston causing it to withdraw from operative engagement of the master cylinder to release the braking pressure from the vehicle wheel brakes. Shifting of the valve in response to the sensed impending wheel lock condition blocks fluid communication with the reaction piston so that the operated actuated brake pedal is not affected by the brake release mode of anti-lock operation.

If flow from the fluid pump is interrupted due to malfunction, a yieldable link in connection between the brake pedal and the reaction piston collapses to allow the reaction piston to operatively engage the manual piston which in turn engages the power piston to apply the vehicle wheel brakes independently of operation of the fluid pump.

Figure 1:
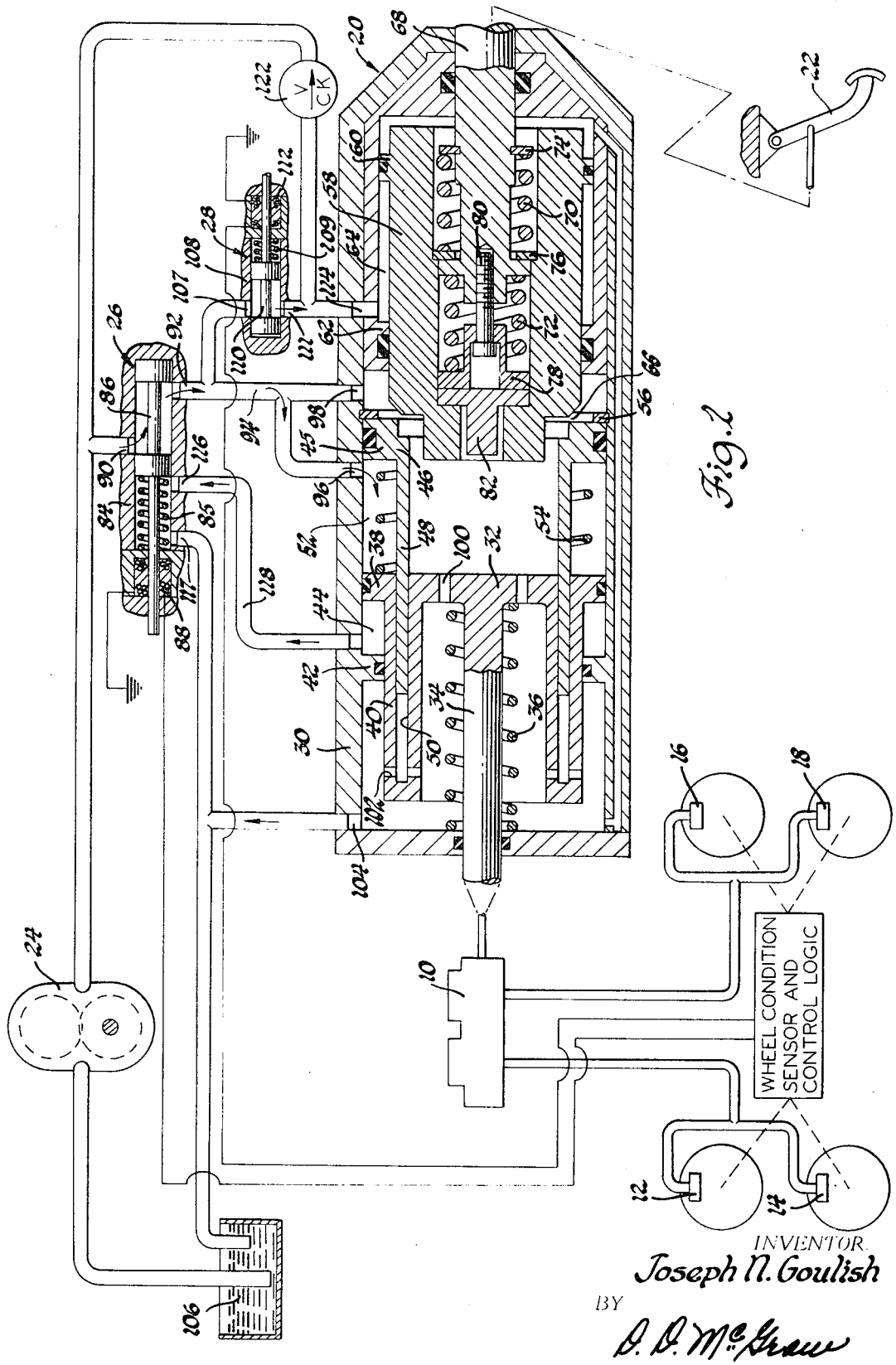
FIG. 1 is a schematic illustration of a wheel anti-lock control system embodying the booster and modulator assembly which is shown in section with the brake applied.

The wheel anti-lock control system includes a master cylinder 10 illustrated as being of the dual pressure chamber type with the front chamber being connected to a pair of wheel brakes 12 and 14 and the rear pressure chamber being connected to a second pair of wheel brakes 16 and 18. The booster and modulator assembly 20 is actuated by movement of a brake pedal 22 and operatively engages the master cylinder 10. Pump 24 provides fluid flow for operation of the booster and modulator assembly 20. Solenoid controlled valves 26 and 28 are electrically actuable by a signal generated by a wheel condition sensor and electronic logic, a suitable example of which is disclosed in U.S. Pat. No. Harned et al. 3,524,685, to control the anti-lock cycle of the booster and modulator assembly 20.

Booster and modulator assembly 20 includes a housing 30 in which power piston 32 is located. Power piston 32 includes a push rod 34 which extends sealingly through housing 30 into operative engagement with the master cylinder 10. Spring 36 is seated at housing 30 and engages power piston 32 urging it rearwardly to release the master cylinder generated brake pressure. A shoulder 38 and axially extending wall 40 of power piston 32 cooperate with shoulder 42 formed in housing 30 to form expansible chamber 44. Manual piston 46 is located in housing 30 and includes shoulder 45 which sealingly engages housing 30. An axially extending annular wall 48 of manual piston 46 is sealingly slidable in a cylindrical recess 50 formed in the axially extending wall 40 of power piston 32. The shoulder 45 and wall 48 of manual piston 46 cooperate with housing 30 and shoulder 38 of power piston 32 to form a second expansible chamber 52. Spring 54 acts between power piston 32 and manual piston 46 urging manual piston 46 into engagement of snap ring 56 which is seated in housing 30. The rest position of power piston 32 is defined by the engagement of wall 48 with the bottom of recess 50 of power piston 32 at the urging of spring 36. Pressurized operating fluid admitted to the second expansible chamber 52 acts on power piston 32 moving it leftwardly to actuate the master cylinder. Operating fluid pressure communicated to the first expansible chamber 44 acts on power piston 32 moving it rightwardly to release the brake.

Reaction piston 58 includes a shoulder 60 which is sealingly slidable in housing 30 and cooperates with shoulder 62 of housing 30 to form a third expansible chamber 64. Port 66 is formed between manual piston 46 and reaction piston 58. Movement of reaction piston 58 toward manual piston 46 narrows port 66 limiting fluid flow therethrough. Reaction piston 58 is urged into flow restricting proximity with manual piston 46 by forward movement of pedal push rod 68 which acts through the resilient connection of springs 70 and 72. Pedal push rod 68 extends sealingly through the wall of housing 30 and is pivotally attached to brake pedal 22. Spring 70 engages pedal push rod 68 at spring seat 74 and engages reaction piston 58 at spring seat 76. Spring 72 is seated at pedal push rod 68 and at annular member 78. Bolt 80 threadedly engages pedal push rod 68 and slidably engages annular member 78 so as to hold annular member 78 and pedal push rod 68 at a fixed distance apart as urged by spring 72. Spring 72 is collapsible to allow abutting engagement of push rod 68 and annular member 78. Member 82 acts as a spacer between annular member 78 and reaction piston 58.

Control valve 26 includes a housing 84, a valve spool 86 which is slidable therein, a spring 85 which urges valve spool 86 to its normal position, and a solenoid coil 88 which encircles the valve spool 86. FIG. 1 shows the booster and modulator 20 in the brake applied position with operating fluid being communicated from pump 24 to inlet port 90 of control valve 26. Solenoid coil 88 is deenergized permitting fluid flow through the control valve 26 to the valve outlet port 92. Conduit 94 connects valve outlet port 92 with inlet ports 96 and 98 in housing 30 which respectively communicate with the second expansible chamber 52 and the flow restricting port 66. In the absence of pedal actuation, the fluid flow restricting port 66 is open permitting unrestricted flow of operating fluid at substantially zero pressure through passageways 100 and 102 of power piston 32 to the fluid outlet port 104 of housing 30 which communicates with the pump reservoir 106.

The control valve 28 receives operating fluid from valve outlet port 92 of control valve 26 and includes housing 108 in which valve spool 110 is slidable. Valve spool 110 is urged to its normal position by spring 109 and is encircled by solenoid coil 112. Solenoid coil 112 is deenergized allowing communication of operating fluid from valve inlet port 107 to valve outlet port 111 and the third expansible chamber 64 which is connected thereto through port 114 of housing 30.

Brake actuation is through movement of brake pedal 22 by the vehicle operator. Brake applying movement of brake pedal 22 and the attached pedal push rod 68 is transmitted to reaction piston 58 through the resilient connection of springs 70 and 72 thereby moving reaction piston 58 into closer relationship with manual piston 46. The resulting restriction of operating fluid flow through port 66 causes a back-pressure at inlet port 98 which is communicated through conduit 94 to second expansible chamber 52 where it forces power piston 32 leftwardly actuating master cylinder 10. The back-pressure is also communicated through conduit 94, control valve 28, and port 114 to third expansible chamber 64 where it acts on reaction piston 60 urging it rightwardly providing a pedal reaction force through the resilient connection of springs 70 and 72. Reaction piston 58 moves only a short distance during brake actuation since the springs 70 and 72 are compressed to allow travel of brake pedal 22. When the operator removes the pedal actuating force from the brake pedal 22, pedal push rod 68 moves rightwardly followed by reaction piston 58 thereby opening the flow restricting port 66 and allowing dissipation of the back-pressure through port 66 to the pump reservoir 106.

Figure 2:
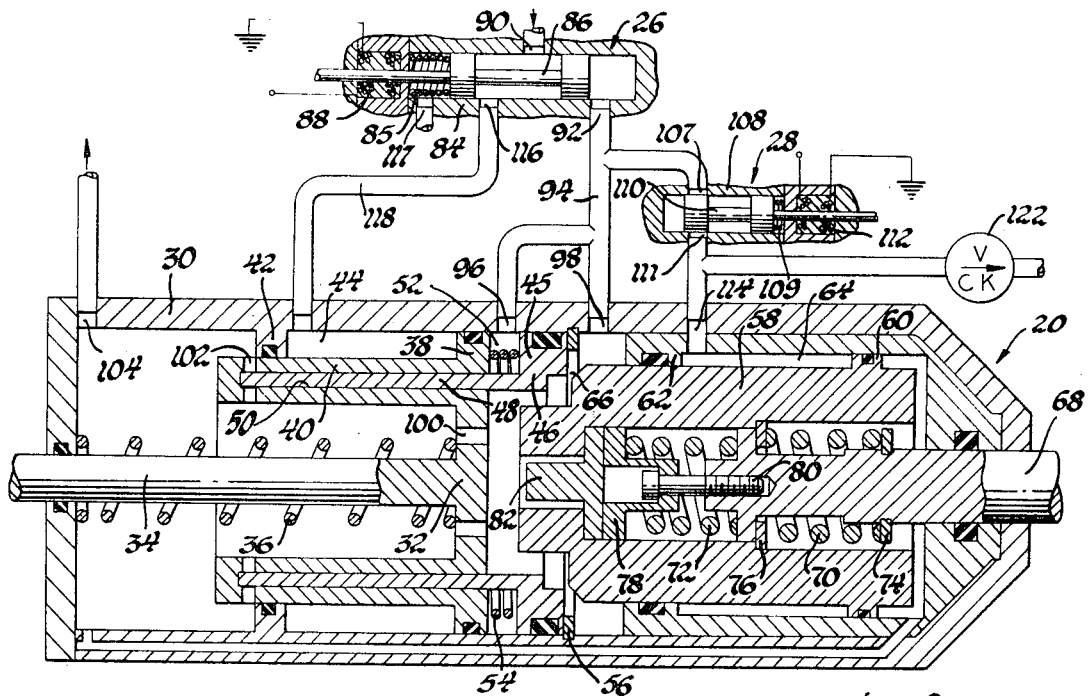
FIG. 2 is a sectional view of the booster and modulator assembly of FIG. 1 shown in the brake released mode of the anti-lock cycle.

If excessive pedal force is applied during a panic stop situation causing an impending wheel lock condition, the wheel condition sensor and control logic provides an electric signal which operates control valves 26 and 28. As shown in FIG. 2, energization of solenoid coil 88 shifts valve spool 86 leftwardly blocking fluid communication between pump 24 and valve outlet port 92 and opening operating fluid communication with valve port 116 which is connected to the first expansible chamber 44 through conduit 118. The operating fluid pressure communicated to first expansible chamber 44 acts on power piston 32 moving it rightwardly to release the master cylinder and displacing the operating fluid from secondary expansible chamber 52 through conduit 94, port 98, and restriction port 66 to the reservoir 106. Simultaneous energization of solenoid coil 112 shifts valve spool 110 rightwardly blocking fluid communication with third expansible chamber 64 so that the position of reaction piston 58 and thus the magnitude of the pedal reaction force is not affected by the brake release mode of anti-lock operation.

When the impending wheel lock condition has been arrested by the brake pressure decrease, the wheel condition sensor and control logic deenergizes the solenoid coils 88 and 112 allowing springs 85 and 109 to return the respective control valves 26 and 28 to their normal positions. Return of the control valve 26 to the normal position reestablishes communication of the back-pressure from port 66 to the second expansible chamber 52 forcing power piston 32 leftwardly to actuate the master cylinder. The operating fluid displaced from first expansible changer 44 is communicated through conduit 118, valve port 116, and exhaust port 117 to the pump reservoir 106. The return of control valve 28 to the normal position reestablishes communication of the back-pressure between port 66 and third expansible chamber 64. This cycle of brake release and brake apply is continued until the vehicle is brought to a stop, or until the vehicle operator removes sufficient force from the brake pedal 22 to reduce the back-pressure to a level resulting in a brake application without approaching the wheel locking condition.

Figure 3:
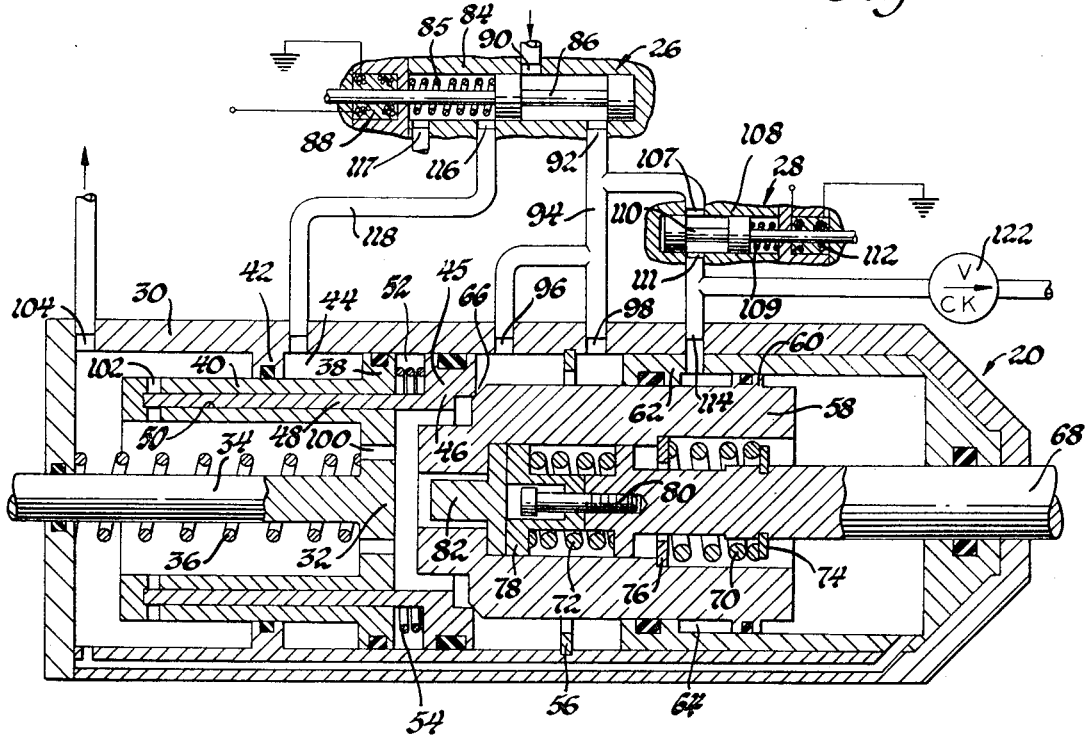
FIG. 3 is a cross-sectional view of the booster and modulator assembly of FIG. 1 showing the brake applied by manual actuation.

In the event of a loss of operating fluid flow due to a pump failure or similar malfunction the booster and modulator assembly 20 can be manually actuated, thereby preventing a loss of vehicle braking. As viewed in FIG. 3, spring 72 is collapsible upon overtravel of pedal push rod 68 to permit abutting engagement of the pedal push rod 68 with the annular member 78, thereby providing a rigid force transmitting link between pedal push rod 68 and reaction piston 58. Pedal push rod overtravel carries the reaction piston 58 into abutting engagement of manual piston 46. Through the engagement of wall 48 of manual piston 46 with the bottom of the cylindrical recess 50 of power piston 32, the power piston 32 is carried forwardly to actuate the master cylinder 10. Check valve 122 relieves operating fluid from the third expansible chamber 64 when the reaction piston 58 is moved forwardly during manual actuation of the master cylinder 10. Upon release of the brake actuating force from brake pedal 22, springs 36, 54, 70 and 72 return the booster and modulator assembly components to their normal rest positions.

Thus, a combined open-center hydraulic booster and anti-lock modulator is provided. It is noted that while the embodiment of FIG. 1 provides a booster and modulator assembly which actuates one master cylinder providing brake pressure to four vehicle wheels, it is within the scope of this invention to provide more than one master cylinder and booster and modulator assembly so as to control the vehicle wheel brakes individually or in any desired combination.

What is claimed is:

1. A brake control system including a set of pressure actuated vehicle wheel brakes, a master cylinder connected to said vehicle wheel brakes for actuation thereof, wheel condition sensing means, fluid pump means providing a continuous flow of operating fluid, and a fluid reservoir and comprising:

a housing;

a power piston sealingly slidable in said housing and forming therewith a first expansible chamber, said power piston including means engaging said master cylinder for actuation thereof;

a manual piston sealingly slidable in said housing and forming therewith a second expansible chamber;

a reaction piston sealingly slidable in said housing and forming therewith a third expansible chamber, said reaction piston being normally spaced from said manual piston forming therebetween a fluid port;

fluid passage means communicating operating fluid from said fluid port to said reservoir;

conduit means including valve means normally communicating operating fluid to said fluid port, said second expansible chamber, and said third expansible chamber;

pedal actuated yieldable means moving said reaction piston into flow restricting proximity with said manual piston creating a back-pressure communicated to said second expansible chamber urging said power piston forwardly to actuate said vehicle wheel brakes and to said third expansible chamber urging said reaction piston rearwardly and acting through said yieldable means to provide pedal feel;

said wheel condition sensing means shifting said valve means upon sensing an incipient wheel lock condition thereby blocking fluid communication with said third expansible chamber to lock the position of said reaction piston, blocking flow of operating fluid to said fluid port to allow relief of said back-pressure from said second expansible chamber, and communicating operating fluid to said first expansible chamber to urge said power piston rearwardly to release said vehicle wheel brakes;

said pedal actuated yieldable means moving said reaction piston into abutting engagement of said piston and said manual piston into abutting engagement of said power piston upon overtravel thereof to actuate said power piston and said master cylinder independent of operating fluid flow.

2. A brake control system including a set of pressure actuated vehicle wheel brakes, a master cylinder connected thereto for actuation of said vehicle wheel brakes, wheel condition sensing means, fluid pump means providing a continuous flow of operating fluid and a fluid reservoir and comprising:

a housing having an axially extending chamber therein;

a power piston sealingly slidable in said housing and cooperating therewith to form a first expansible chamber, said power piston including means engaging said master cylinder;

a manual piston sealingly slidable in said housing and forming with said power piston and said housing a second expansible chamber;

stop means associated with said housing;

first spring means urging said manual piston into engagement with said stop means;

second spring means urging said power piston in a direction away from operative engagement with said master cylinder and into engagement with said manual piston;

a reaction piston sealingly slidable in said housing and forming a third expansible chamber, said reaction piston being normally spaced from said manual piston forming therebetween a fluid port;

fluid passage means communicating operating fluid from said fluid port to said reservoir;

conduit means including valve means normally communicating operating fluid to said fluid port, said second expansible chamber, and said third expansible chamber;

pedal actuated yieldable means moving said reaction piston toward said manual piston restricting operating fluid flow through said fluid port and causing a back-pressure, said back-pressure being communicated to said second expansible chamber urging said power piston forwardly into operative engagement with said master cylinder to actuate said vehicle brakes and to said third expansible chamber urging said reaction piston rearwardly and acting through said yieldable means to provide pedal feel;

said wheel condition sensing means shifting said valve means upon sensing an incipient wheel lock condition thereby blocking fluid communication with said third expansible chamber to lock the position of said reaction piston and blocking flow of operating fluid to said fluid port to allow relief of said back-pressure from said second expansible chamber, and communicating operating fluid to said first expansible chamber to urge said power piston rearwardly withdrawing said power piston from operative engagement with said master cylinder to release said vehicle wheel brakes;

said pedal actuated yieldable means moving said reaction piston into abutting engagement of piston and said manual piston into abutting engagement of said power piston upon overtravel thereof to actuate said power piston and said master cylinder independent of operation of said fluid pump means;

and check valve means permitting fluid flow from said third expansible chamber upon interrupted operation of said fluid pump means to release said back-pressure and permit movement of said manual piston.

3. A brake control system including a set of pressure actuated vehicle wheel brakes, a master cylinder connected to said vehicle wheel brakes for actuation thereof, wheel condition sensing means, fluid pump means providing a continuous flow of operating fluid, and a fluid reservoir, and comprising:

a housing having an axially extending chamber and first and second radially inward extending shoulders;

a power piston having a radially outward extending shoulder sealingly engaging said housing and forming with said first shoulder thereof a first expansible chamber, a master cylinder push rod sealingly extending through a wall of said housing into engagement with said master cylinder, and an axially extendING annular wall having an axially extending cylindrical recess therein;

a manual piston having an axially extending annular wall slidable in said cylindrical recess of said power piston and a radially outward extending shoulder sealingly engaging said housing and forming therewith in cooperation with said power piston a second expansible chamber;

stop means engaging the bore of said housing;

first spring means acting between said power piston and said manual piston and urging said manual piston into engagement with said stop means;

second spring means acting against said power piston and collapsing said first spring means to move said power piston out of operative engagement with said master cylinder, movement of said power piston in the master cylinder disengaging direction being limited by engagement of said power piston with said manual piston;

a reaction piston having a radially outward extending shoulder sealingly engaging said housing and forming with said second shoulder thereof a third expansible chamber, said reaction piston being normally spaced from said manual piston forming therebetween an unrestricted fluid passage;

fluid passage means communicating operating fluid from said fluid passage to said reservoir;

a pedal actuated push rod sealingly extending into said housing at the end thereof opposite said master cylinder push rod;

yieldable means in connection between said push rod and said reaction piston;

conduit means directly connecting said fluid passage and said second expansible chamber and including first and second valve means, said first valve means normally communicating operating fluid to said fluid passage and said second expansible chamber, said second valve means normally communicating operating fluid to said third expansible chamber;

movement of said reaction piston by said pedal push rod acting through said yieldable means moving said reaction piston toward said manual piston thereby restricting fluid flow therebetween and causing a back-pressure, said back-pressure being communicated through said conduit means to said second expansible chamber urging said power piston forwardly into operative engagement with said master cylinder to actuate said vehicle wheel brakes, said back-pressure being communicated through said conduit means to said third expansible chamber and urging said reaction piston rearwardly to provide pedal feel;

said wheel condition sensing means connected to said first and second valve means and shifting said valve means upon sensing an incipient wheel lock condition, said shifting of said second valve means blocking fluid communication with said third expansible chamber to lock the position of said reaction piston, said shifting of said first valve means blocking flow of operating fluid to said fluid passage to allow relief of said back-pressure from said second expansible chamber and communicating fluid to said first expansible chamber to urge said power piston rearwardly withdrawing said master cylinder push rod from operative engagement with said master cylinder to release said vehicle wheel brakes;

lost motion means in connection between said pedal push rod and said reaction piston and cooperating with said yieldable means upon overtravel of said pedal push rod to allow abutting engagement of said pedal push rod, said reaction piston and said manual piston and consequent actuation of said abutting power piston independent of operation of said fluid pump means;

and check valve means in connection between said third expansible chamber and said fluid pump means permitting fluid flow from said third expansible chamber to said pump means when unseated by differential pressure upon interrupted operation of said fluid pump means to release said back-pressure and permit movement of said reaction piston.

* * * * *